(12) United States Patent
Smith

(10) Patent No.: US 7,885,933 B2
(45) Date of Patent: *Feb. 8, 2011

(54) APPARATUS AND SYSTEM FOR ANALYZING COMPUTER EVENTS RECORDED IN A PLURALITY OF CHRONICLE DATASETS

(75) Inventor: Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/139,349

(22) Filed: Jun. 13, 2008

(65) Prior Publication Data

US 2008/0249978 A1    Oct. 9, 2008

Related U.S. Application Data

(63) Continuation of application No. 11/242,516, filed on Oct. 3, 2005, now Pat. No. 7,418,450.

(51) Int. Cl.
*G06F 17/00* (2006.01)
(52) U.S. Cl. ...................................... 707/641; 707/609
(58) Field of Classification Search ................. 707/609, 707/641
See application file for complete search history.

(56) References Cited

U.S. PATENT DOCUMENTS

| | | | |
|---|---|---|---|
| 6,618,040 B1 | 9/2003 | Mattaway et al. | |
| 6,732,123 B1 | 5/2004 | Moore et al. | |
| 6,754,890 B1 | 6/2004 | Berry et al. | |
| 2003/0055809 A1 | 3/2003 | Bhat | |
| 2003/0088853 A1 | 5/2003 | Iida et al. | |
| 2004/0073665 A1 | 4/2004 | Fujiwara et al. | |
| 2004/0103105 A1 | 5/2004 | Lindblad et al. | |
| 2004/0139474 A1 | 7/2004 | Carro | |
| 2005/0009499 A1 | 1/2005 | Koster | |
| 2005/0039065 A1 | 2/2005 | Cheung et al. | |
| 2006/0010122 A1 | 1/2006 | Chellam et al. | |
| 2006/0069691 A1 | 3/2006 | Kawai | |

OTHER PUBLICATIONS

G. H. Hjaltason and H. Samet, "Index-Driven Similarity Search in Metric Spaces", ACM Transactions on Database Systems, vol. 28 No. 4, Dec. 2003, pp. 517-526.

Y. Zhang and R. Gupta, "Path Matching in Comopressed Control Flow Traces", Data Compresseion Conference, 2002 IEEE.

*Primary Examiner*—Mohammad Ali
*Assistant Examiner*—Thuy (Tiffany) Bui
(74) *Attorney, Agent, or Firm*—Kunzler Needham Massey & Thorpe

(57) ABSTRACT

An apparatus and system are disclosed for analyzing computer events recorded in a plurality of computer datasets. The apparatus includes a read module configured to access chronicle records in two datasets, an extraction module configured to extract a timestamp from each chronicle record, a generation module configured to generate a chronicle time indicator for each chronicle record based on the extracted timestamp, and a placement module configured to place the generated chronicle time indicator into the associated chronicle record. Typically, chronicle records in a first chronicle record have records with desired timestamp characteristics while chronicle records in a second dataset have chronicle records with incompatible timestamp characteristics. The apparatus and method generate the chronicle time indicator to be compatible with desired timestamp characteristics of the first dataset and place the generated chronicle time indicator in each incompatible chronicle record.

13 Claims, 5 Drawing Sheets

APPARATUS AND SYSTEM FOR ANALYZING COMPUTER EVENTS RECORDED IN A PLURALITY OF CHRONICLE DATASETS

CROSS REFERENCE TO RELATED APPLICATIONS

This application is a continuation of and claims priority to U.S. patent application Ser. No. 11/242,516 entitled "Method for Analyzing Computer Events Recorded in a Plurality of Chronicle Datasets" and filed on Oct. 3, 2005 for Alan Ray Smith, which is incorporated herein by reference.

BACKGROUND OF THE INVENTION

1. Field of the Invention

This invention relates to timestamps in data records used to store trace events and more particularly relates to modifying trace records to make them compatible with a desired timestamp format found in log records.

2. Description of the Related Art

Many applications record operational events into various datasets or files. These files chronicle a sequence of historical events using a single record for each event. Various names are given to these files including log datasets, log files, trace datasets, trace files and so forth. To avoid confusion, this application uses the term chronicle dataset to reference all types of files that record a sequential listing of operational events. Chronicle datasets comprise log datasets and trace datasets as well as all other computer files which record operational events. Records within chronicle datasets are generally organized in chronological order.

Chronicle datasets comprise a sequence of records. Each record stores information about a single operational event. Each record contains a timestamp or is organized in such a way that a timestamp could be created for each record. The timestamp indicates the creation time of the record and/or the time that the operational event occurred.

A software developer may create a chronicle point in software code. A chronicle point is often termed a trace point or a log entry point. A chronicle point is the point in the software where the software creates a chronicle record. An operator my set various flags to activate and deactivate chronicle points.

Activation of all chronicle points creates a more extensive chronicle dataset. However, activation of all chronicle points may also retard the performance of the software and may cause the creation of an unmanageable number of chronicle records. In response to these and other problems, developers have created many distinct formats for chronicle records and chronicle datasets. In fact, many software applications create chronicle records for multiple chronicle datasets in multiple formats.

Computer operators, software developers, and service personnel use chronicle datasets to evaluate and improve the operation of applications. A developer may determine delay time for a specific code path by comparing timestamps for chronicle records created upon entry into the code path and upon exit from the code path. A service technician may determine appropriate tuning parameters based on an analysis of a chronicle dataset.

Service personnel use various service tools to assist them in analyzing chronicle datasets. Service personnel use service tools to sort chronicle records according to various criteria to make the chronicle records more meaningful. Service tools may sort chronicle records according to creation time or according to a sequence number in each chronicle record. Service tools may also sort and/or filter chronicle records according to record type, flow type, the host name that created the chronicle record, the application that created the chronicle record, etc.

Normally, a service tool only sorts or orders a single chronicle dataset containing similarly formatted chronicle records. However, service personnel may sometimes analyze chronicle records from different sources, which have varied formats. Although service tools exist which can merge multiple datasets with similarly formatted records, service tools cannot merge all record types and formats. Typically, service tools merge and sort chronicle records according to a timestamp field stored in each record. However, many chronicle records contain timestamps with distinct formats.

Some chronicle point types create chronicle records with a timestamp at the beginning of the record while other chronicle point types place the timestamp as field at the end of the chronicle record. In addition, distinct chronicle point types use distinct formats to store the time value in a timestamp field. Generally, differences in timestamp formats create most service tool merge problems. In order to analyze the performance of a software application properly, it may be desirable to use chronicle records from multiple chronicle datasets with incompatible formats. It would be very expensive to rewrite current service tools to handle all chronicle record formats.

From the foregoing discussion, it should be apparent that a need exists for an apparatus and system that facilitates analysis of multiple chronicle datasets with distinct record formats to allow service personnel and others to properly analyze chronicle datasets as a whole. Beneficially, such an apparatus and system would allow service personnel and others to correlate operational events and more quickly evaluate and improve software applications using existing service tools.

SUMMARY OF THE INVENTION

The present invention has been developed in response to the present state of the art, and in particular, in response to the problems and needs in the art that have not yet been fully solved by currently available software. Accordingly, the present invention has been developed to provide an apparatus, and system for analyzing computer events recorded in a plurality of chronicle datasets with incompatible formats that overcome many or all of the above-discussed shortcomings in the art.

A programmed method is presented for analyzing computer events recorded in a plurality of chronicle datasets. The programmed method in the disclosed embodiments substantially includes the steps necessary to carry out the process steps of accessing a chronicle dataset and a log dataset; extracting a timestamp; generating a chronicle time indicator; and placing the chronicle time indicator into one of the accessed chronicle records.

In one embodiment, the programmed method is in the form of process steps. In another distinct embodiment, the programmed method is in the form of a computer-readable medium embodying computer instructions for performing the process steps. In another distinct embodiment, the programmed method is in the form of a computer system programmed by software, hardware, firmware, or any combination thereof, for performing the process steps. In yet another embodiment, the programmed method is in the form of an apparatus comprising software, hardware, firmware, or any combination thereof, for performing the process steps.

In one embodiment, the accessing program step includes accessing a chronicle record in a chronicle dataset as well as accessing log records in a log dataset. The chronicle record has a timestamp; however, the timestamp in the chronicle record has a format incompatible with the format of the timestamps from the log records. The incompatibility of the timestamp formats may relate to the lengths of the timestamps, the encoding algorithm for the various timestamps, and also may relate to the placement of the timestamps in the records.

In one embodiment, the extraction process step includes accessing a chronicle timestamp definition. The chronicle timestamp definition may detail the timestamp format, the timestamp encoding, and/or the offset of the timestamp in the chronicle record. A user of a program may enter the chronicle timestamp definition or the program may the definition from a timestamp definition file or database.

In one embodiment, the programmed method further includes a process step to identify a chronicle record which is incompatible with the log records. Identification of the incompatible records may rely on the chronicle timestamp definition described above.

The process step of generating a chronicle time indicator modifies the extracted timestamp from an incompatible format to a compatible format. The compatible format matches the format of the log time indicator of the log records in the log dataset.

The process step of placing the chronicle time indicator into the chronicle record comprises updating the chronicle record with the generated chronicle time indicator. The process step places the chronicle time indicator into the chronicle record such that the modified chronicle record and the log records may be merged and sorted using traditional tools which depend on the placement and the format of the log time indicator in the log records. The programmed method may further include merging and sorting the updated chronicle record with the log records.

In a further embodiment, the process step of extracting the timestamp from the chronicle record my comprise reading a twelve byte packed decimal value. Generating a chronicle time indicator may further comprise converting the twelve byte packed decimal value into a sixty-four bit binary number representative of time duration since Jan. 1, 1900. The converted sixty-four bit binary number may be compatible with a mainframe time of day clock value.

A system for analyzing computer events recorded in a plurality of datasets is also presented. The system is provided with a logic unit containing a plurality of components configured to functionally execute the necessary steps. These components in the described embodiments include a read module, an extraction module, a generation module, a placement module, an optional identification module, and an optional merge module.

The components of the system perform the process steps described above. The read module accesses chronicle dataset records and log dataset records. The extraction module extracts a timestamp from a chronicle record. The generation module generates a chronicle timestamp indicator compatible with a log time indicator from the log dataset records. The placement module places the updated chronicle time indicator in the chronicle record. The optional identification module may identify the chronicle records which contain incompatible chronicle records. The optional merge module may merge the updated chronicle record with the log dataset records.

A method for analyzing computer events recorded in a plurality of datasets. The method is generally used by service personnel in analyzing and/or servicing systems which use chronicle datasets. The method in the disclosed embodiments substantially includes the steps necessary to carry out the functions presented above with respect to the operation of the described process method and system.

In one embodiment, the method includes accessing a chronicle record and log records. The log records have a particular format including a timestamp in the form of a log time indicator. The chronicle record has timestamp whose format is incompatible with the format of the log time indicator. The method further includes extracting the timestamp from the chronicle record and generating a chronicle time indicator based on the extracted timestamp.

In one embodiment, the method further includes placing the chronicle time indicator into the chronicle record such that the updated chronicle record may be easily merged and sorted with the log records using the log record log time indicators and the chronicle time indicator of the chronicle record.

In one embodiment, the method further includes identifying chronicle records in a chronicle dataset which have timestamps which are incompatible with log time indicators in the log records. In some embodiments, the identifying step utilizes a chronicle timestamp definition retrieved from service personnel executing the method or from a file or database containing such definitions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

One preferred embodiment, in accordance with the present invention, is directed to a programmed method for analyzing computer events recorded in a plurality of chronicle datasets. The term "programmed method", as used herein, is defined to mean one or more process steps that are presently performed; or, alternatively, one or more process steps that are enabled to be performed at a future point in time. This enablement for future process step performance may be accomplished in a variety of ways. For example, a system may be programmed by hardware, software, firmware, or a combination thereof to perform process steps; or, alternatively, a computer-readable medium may embody computer readable instructions that perform process steps when executed by a computer.

The term "programmed method" anticipates four alternative forms. First, a programmed method comprises presently performed process steps. Second, a programmed method comprises a computer-readable medium embodying computer instructions, which when executed by a computer, perform one or more process steps. Third, a programmed method comprises an apparatus having hardware and/or software modules configured to perform the process steps. Finally, a programmed method comprises a computer system that has been programmed by software, hardware, firmware, or any combination thereof, to perform one or more process steps.

It is to be understood that the term "programmed method" is not to be construed as simultaneously having more than one alternative form, but rather is to be construed in the truest sense of an alternative form wherein, at any given point in time, only one of the plurality of alternative forms is present. Furthermore, the term "programmed method" is not intended to require that an alternative form must exclude elements of other alternative forms with respect to the detection of a programmed method in an accused device.

Figure 1:
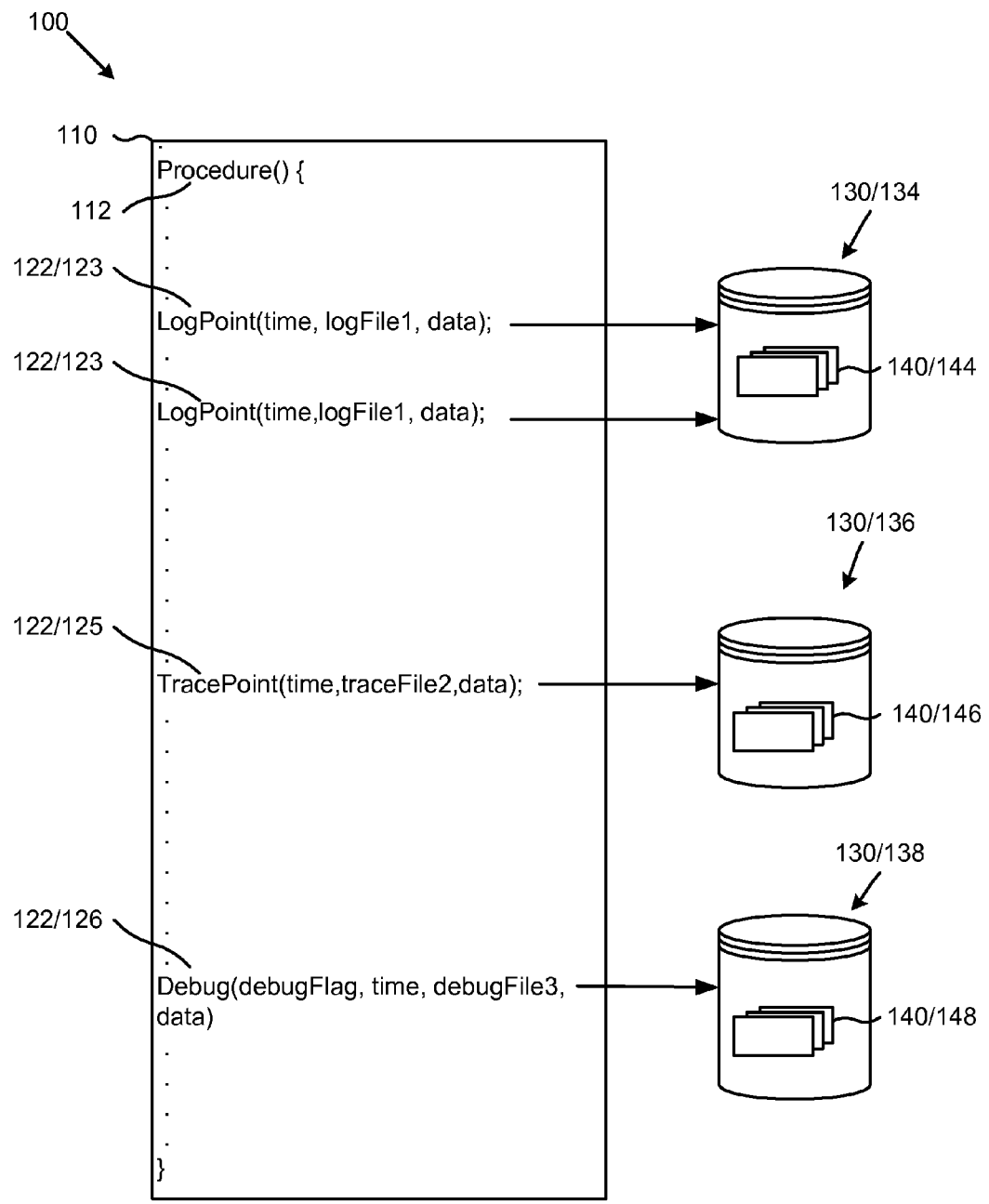
FIG. 1 is a computer program which illustrates an environment in which the chronicle records used in one embodiment of the present invention are created.

FIG. 1 is a block diagram illustrating an event analyzer 100 comprising a software application 110 and three chronicle datasets 130.

A chronicle dataset 130 comprises or more chronicle records 140. Each record 140 represents a historical operational event related to the operation of a computer system. Each record 140 comprises a timestamp or some indicator suitable for determining a timestamp. In addition, each record 140 may comprise special codes and data. The format of chronicle records 140 will be discussed further below in relation to FIGS. 2A-2D.

Three types of chronicle datasets 130 are depicted in FIG. 1: a log dataset 134, a trace dataset 136, and a debug dataset 138. These chronicle dataset types do not represent an exhaustive list of chronicle dataset types, but are simply given to illustrate three different types of chronicle datasets 130.

The software application 110 includes a procedure 112. A partial listing of sample source code for procedure 112 illustrated. Procedure 112 includes four chronicle points 122. A chronicle point 122 is a point in a software application in which the software executes code to create a chronicle record 140.

The chronicle points 122 maybe classified according to the type of chronicle record 140 created by the chronicle point 122. Chronicle points 122 include but are not limited to a log point 123, a trace point 125 and a debug point 126. Log points 123 call a LogPoint procedure which creates a log record 144, a first type of chronicle record 140. Trace point 125 calls a TracePoint procedure to create a trace record 146, a second type of chronicle record 140. Debug point 126 calls a Debug procedure to create a debug record 148, a third type of chronicle record 140. In the illustrated embodiment, the log points create append log records 144 to the log dataset 134. The trace point 125 appends trace records 146 to the trace dataset 136, and the debug point 126 appends debug records 148 to the debug dataset 138.

Generally, all chronicle records 140 in a single chronicle dataset 130 share the same format. Dissimilarities between the formats of chronicle records 140 in distinct chronicle datasets 130 do exist. The dissimilarities create problems when trying to merge chronicle datasets 130 to analyze events in light of multiple chronicle datasets 130. Log records 144 and trace records 146 and their distinctions are discussed in more detail below in connection with FIGS. 4A-4D.

Figure 2:
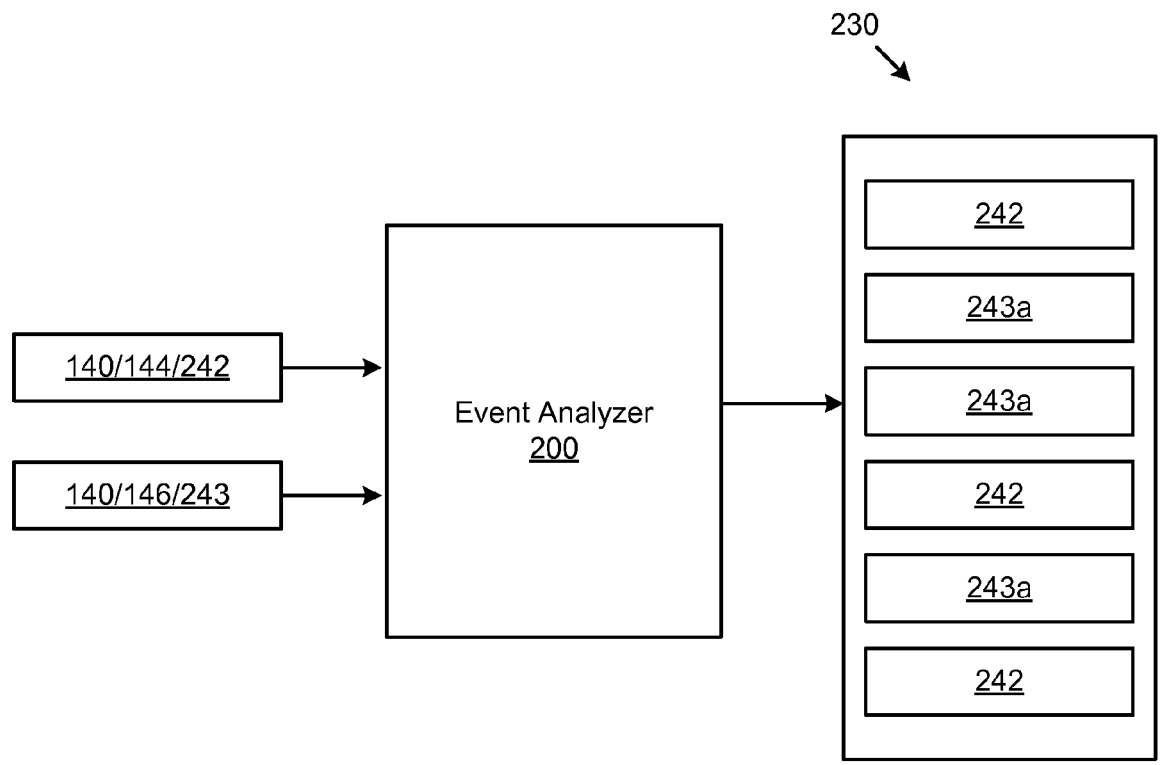
FIG. 2 is a schematic block diagram illustrating one embodiment of a system for analyzing computer events recorded in chronicle datasets.

FIG. 2 illustrates a schematic block diagram of an event analyzer 200. The event analyzer operates on chronicle records 140 of different types. The event analyzer accesses chronicle records 140, which may be log records 144, trace records 146, debug records 148, and other types of chronicle records 140.

The event analyzer 200 modifies, changes, or updates the chronicle records 140 to facilitate merging and sorting of the chronicle records to a single output chronicle dataset 230. The event analyzer 200 may merge the chronicle records 140 and may sort the chronicle records 140. However, legacy analysis tools may accomplish the tasks of merging and sorting. The event analyzer 200 modifies only those chronicle records 140 whose formats do not match the format expected the legacy tools.

In operating on different chronicle records 140, the event analyzer 200 typically differentiates between two classes of chronicle records 140: compatible chronicle records 242 and incompatible chronicle records 243. Compatible chronicle records 242 have timestamps with desired timestamp characteristics. Incompatible chronicle records 243 have timestamps without desired timestamp characteristics. Typically, the legacy tools that analyze chronicle records 140 function properly only if the timestamp in a chronicle record 140 conforms to specific desired timestamp characteristics.

Periodically, it is necessary to analyze chronicle records 140 of different types, for example, log records 144 and trace records 146. The timestamp characteristics of a log record 144 are distinct from the timestamp characteristics of a trace record 146. The characteristics of a timestamp which are important to legacy tools include the timestamp location in the chronicle record 140, the timestamp length and the timestamp encoding. This list of timestamp characteristics provides examples of timestamp characteristics and is not an exhaustive list. Each of these timestamp characteristics is discussed in further detail below with respect to FIGS. 4A-4D.

The event analyzer 200 reads both compatible chronicle records 242 and incompatible chronicle records 243. The event analyzer 200 writes unmodified compatible chronicle records 242 into an output chronicle dataset 230. However, the event analyzer 200 modifies the incompatible chronicle records 243 to create modified compatible chronicle records 243a which are compatible with compatible chronicle records 242 with respect to timestamp characteristics. Typically, legacy tools sort chronicle records 140 based on a timestamp contained in each chronicle record 140. By modifying the timestamp chrematistics of incompatible chronicle records 243, the event analyzer 200 creates modified chronicle records 243a the legacy tools analyze.

With respect to FIG. 2, the event analyzer 200 may modify some or all of the input chronicle records 140 such that legacy tools may merge and sort the output chronicle records 140. As an example, event analyzer 200 may determine that all chronicle records 140 must match the format of log records 144. Thus, event analyzer 200 recognizes that log records 144 are compatible chronicle records 242 that need no modification. The event analyzer 200 does not need to modify a compatible chronicle record 242 and stores the unmodified compatible chronicle record 242 in output chronicle dataset 230. However, the event analyzer 200 recognizes that trace record 146 is an incompatible chronicle record 243 and modifies the incompatible chronicle record 243 into a modified compatible chronicle record 243a and stores the modified compatible chronicle record 243a in output chronicle dataset 230. Preferably, the event analyzer 200 only modifies a limited portion of the incompatible chronicle record 243 such that the legacy tools may easily merge and sort the compatible chronicle records 242 together with the modified compatible chronicle records 243a. The event analyzer 200 preferably leaves all data in the incompatible chronicle record 243 unmodified.

Event analyzer 200 may merge and sort the compatible chronicle records 242 and the modified compatible chronicle, 243a in the output chronicle dataset 230. Alternatively, legacy tools may merge, sort, and further analyze the compatible chronicle records 242 and the modified compatible chronicle records 243a in output chronicle dataset 230.

Figure 3:
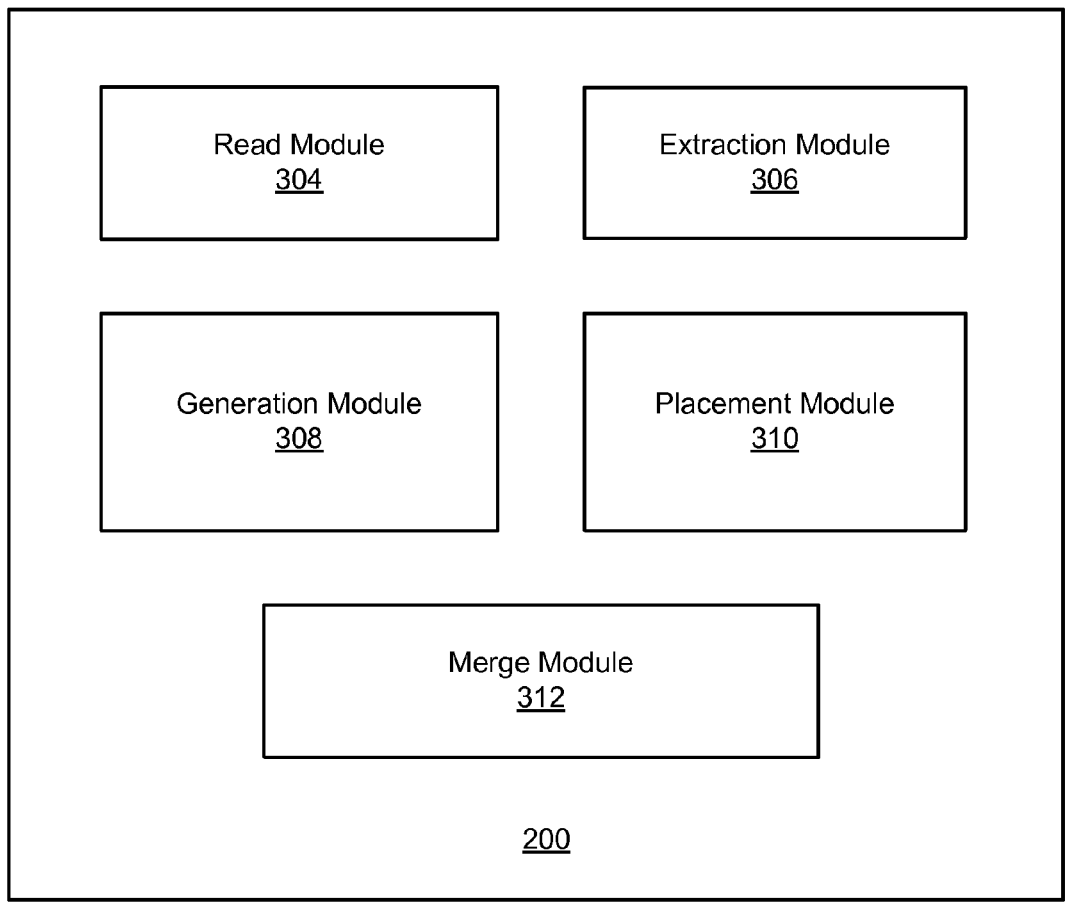
FIG. 3 is a schematic block diagram illustrating one embodiment of an apparatus for analyzing computer events recorded in chronicle datasets.

FIG. 3 illustrates an event analyzer 200 for analyzing computer events recorded in a plurality of chronicle datasets 130. The event analyzer 200 comprises a read module 304, an exaction module 306, a generation module 308, a placement module 310, and a merge module 312. The event analyzer 200 may comprise an independent software application or a module within a larger software program. As such, a computer operator may issue a command to start the event analyzer 200 or a procedure call from another program may start the execution of event analyzer 200.

In one embodiment, the event analyzer 200 reads chronicle records 140 and identifies incompatible chronicle records 243. The event analyzer 200 creates out output dataset 230 comprising compatible chronicle records 242 and modified compatible chronicle records, 243a. Each compatible chronicle record 242 and modified compatible chronicle record 243a comprises a timestamp with desired timestamp characteristics such that the legacy tools may read and analyze output chronicle dataset 230. The various modules function together to achieve this goal.

The read module 304 is configured to access one or more chronicle datasets 130. The read module 304 may access all chronicle datasets 130 including those for log records 144 and trace records 146. Alternatively, the read module 304 may access only chronicle datasets 140 having chronicle records incompatible chronicle records 243. For example, trace records 146 may have undesired timestamp characteristics that are incompatible with desired timestamp characteristics in log records 144. Read module 304 may or may not access log records 144 that already have desired timestamp characteristics.

Extraction module 306 works in conjunction with the read module to extract a timestamp from an incompatible chronicle record 243. Typically, extraction module 306 extracts timestamps having particular characteristics. For example, extraction module 306 may be configured to recognize and extract a timestamp from a trace record 146. In another embodiment, an operator may pass to the extraction module parameters that specify the offset, length, and format of a timestamp for extraction from an incompatible chronicle record 243. An operator may specify such timestamp characteristics as a timestamp definition. The extraction module may use a timestamp definition for identifying and decoding a timestamp in an incompatible chronicle record 243. Alternatively, the extraction module may also retrieve the timestamp definition from a database of such definitions.

Generation module 308 typically generates a timestamp with compatible timestamp characteristics. The generation module 308 may use a timestamp definition that specifies the desired timestamp characteristics. An operator may pass the desired timestamp definition to the generation module, or alternatively, the generation module may retrieve the desired timestamp definition from a database or other location.

In one embodiment, generation module 308, for each incompatible chronicle record 243, creates a chronicle timestamp indicator 438 (See FIGS. 4A-4D) having desired timestamp characteristics. The chronicle timestamp indicator 438 represents the same time value as that extracted from the timestamp of the incompatible chronicle record 243. The chronicle timestamp indicator 438 has the same timestamp characteristics as those found in a compatible chronicle record 242.

In other embodiments for which the desired timestamp characteristics are different, the generation module 308 generates a timestamp having desired timestamp characteristics.

The placement module 310 places the generated timestamp into the associated incompatible chronicle record 243 resulting in a modified compatible chronicle record 243a. In one embodiment, the placement module appends the generated timestamp to the end of the incompatible chronicle record 243. In other embodiments, placement module prepends the generated timestamp to the incompatible chronicle record 243, inserts the generated timestamp into the incompatible chronicle record 243, or writes the generated timestamp over a prior timestamp in the incompatible chronicle record 243. Preferably, the placement module transforms the incompatible chronicle record 243 into a modified compatible chronicle record 243a having the desired timestamp characteristics.

The merge module 312 merges compatible chronicle records 242 with modified compatible chronicle records 243a. The merge module stores merged chronicle records 140 in output chronicle dataset 230. In addition, the merge module may sort the output dataset 230 using the chronicle timestamp indicator 438 in each chronicle record 140. In one embodiment, the merge module 312 merges a dataset of log records 144 with a dataset of modified trace records 146. The modified trace records 146 have a chronicle timestamp indicator 438 compatible with the timestamp in the log records. The merge module merges the two datasets together and sorts the resultant records chronologically according to the timestamps in each chronicle record 140.

FIGS. 4A-4D illustrate alternative embodiments of chronicle records 140. These figures present only two samples of chronicle records 140 and are not exhaustive of the possible embodiments of chronicle records 140.

FIG. 2A illustrates a chronicle record 140. In FIG. 2A, chronicle record 140 is a log record 144. The log record 144 comprises a header 432, a data portion 434, and a log timestamp indicator 436. The log record 144 is typical of log records stored in log datasets on mainframe computers. For Instance, IBM's Information Management System (IMS) Database Management System (DBMS) uses the system log facility to create log records 144 stored in a log dataset 134.

FIG. 2B illustrates an expanded version of the log timestamp indicator 436. The log timestamp indicator 436 comprises two eight byte fields: a log timestamp 442 and a log sequence number 444. The log timestamp 442 holds a sixty-four bit value representative of a duration of time since Jan. 1, 1900. The value stored in a log timestamp 442 may be a mainframe time of day clock or a similarly formatted sixty-four bit value. As an example, IBM's OS/3146 and z/OS mainframe operating systems use a sixty-four bit value for the time of day clock. The log sequence number 444 is a sixty-four bit sequence number that generally increments with each log record entry. However, some log sequence number 444 fields contain all zeros or other values, all ones, or other non-incremented values.

Log timestamp indicator 436 is typical of a chronicle timestamp indicator 438 having desired timestamp characteristics. It should be understood that a chronicle record 140 in a chronicle dataset 130 may take on any of a myriad of different formats. The definition of a specific format offered in this specification does not limit the invention to the format described here.

FIG. 2C depicts a trace record 146 which is another example of a chronicle record 140 that may be stored in a chronicle dataset 130. The trace record 146 comprises header 450 and data portion 254. Header 450 further comprises a header key 451 and a trace timestamp 452. In one embodiment of a trace record, the header key 451 is a two byte hex value of 0x67FA. Other trace records use distinct values for the header key 451. Typically, the header 450 comprises additional fields not illustrated here.

FIG. 2D illustrates an expanded view of one embodiment of a trace timestamp 452. As shown, trace timestamp 452 comprises a twelve byte value divided into thirteen fields. Together, the fields report a specific time, with precision to the nearest microsecond.

Each field in the trace timestamp 452 is stored in packed decimal format. In packed decimal, each nibble holds a single decimal digit. Thus, the year 1982 is represented in a four nibble packed decimal format requiring only two bytes of storage in binary as b0001 b1001 b1000 b0010. In Hexadecimal, the value is expressed as 0x1982. This is distinct from a normal hexadecimal value for 1982 of 0x07BE.

The first field, YYYY, holds a four nibble packed decimal representation of the year. The second field, DDD, holds a three nibble packed decimal representation of the Julian day of the year. The third field, F, holds a one nibble sign value. The next nine fields hold packed decimal values for the hours, the seconds, the tenths of seconds, the hundredths of seconds, the milliseconds, the ten thousandths of second, the hundred thousandths of seconds and the microseconds, respectively. The final field, Aqq$ holds a four nibble value which reflects the difference between the stored time and UTC time.

Figure 4A:
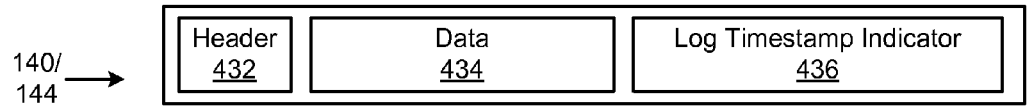
FIG. 4A is a format specification for one embodiment of a chronicle record.
Figure 4B:
FIG. 4B is a format specification of one embodiment of a log timestamp indicator.
Figure 4C:
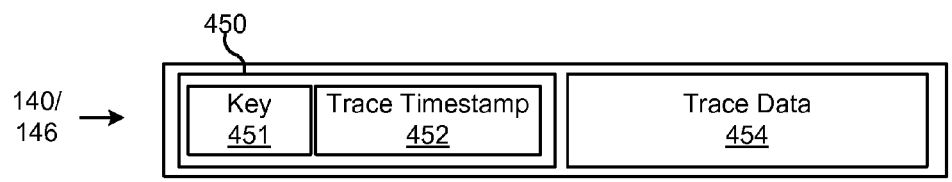
FIG. 4C is a format specification for one embodiment of a chronicle record.
Figure 4D:
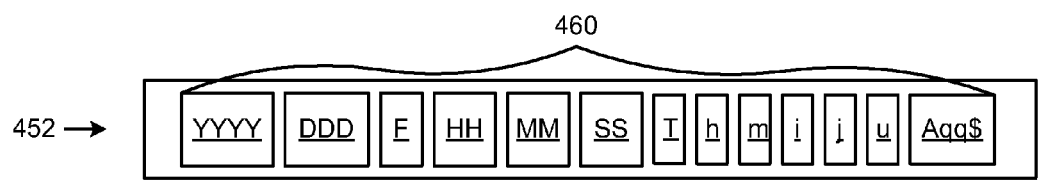
FIG. 4D is a format specification of one embodiment of a trace timestamp.

The trace record 146 illustrated in FIGS. 4C and 4D is typical of a trace record created by the trace facility in IBM's IMS software product as well as other software products.

Computer systems use many different formats for timestamps not illustrated in FIGS. 4A-4D. The trace timestamp 452 and the log timestamp 442 illustrate two methods of representing a precise time values. It is possible to convert a trace timestamp 452 to a format equivalent to a log timestamp 442. Such a converted timestamp 452 may be prepended to a sixty-four bit sequence number to create a chronicle timestamp indicator 438. The chronicle timestamp indicator 438 and the log timestamp indicator 436 exhibit the same format characteristics.

As discussed in reference to FIGS. 2 and 3, in one embodiment of an event analyzer 200, a read module 304 may access a trace record 146. An extraction module 306 may extract trace timestamp 452 from the trace record 146. A generation module 308 may generate a chronicle timestamp indicator using the trace timestamp 452 to create a compatible log timestamp 442. A placement module 310 may append the chronicle timestamp indicator 438 to the end of the trace record 146 to create a modified chronicle record 243a. Finally, a merge module 312 may merge the modified chronicle record 243a with log records 144 in an output dataset 230.

A single chronicle dataset 130 may contain thousands of chronicle records 140. The chronicle records 140 assist service personnel, developers, and others in analyzing the performance of a software application 110. However, as illustrated in FIG. 1, a single procedure 112 in a software application 110 may write chronicle records 140 to multiple chronicle datasets 130 in a variety of formats. In some instances, it is sufficient to look at the records 140 stored in only one chronicle dataset 130. However, it is sometimes useful to look at log records 144 in combination with trace records 146. To carry out such an analysis, service personnel typically merge chronicle records 140 from two or more chronicle datasets 130 into a single chronicle dataset 130. In addition, service personnel typically sort the merged chronicle dataset 130 according to one ore more fields in the chronicle records 140.

Figure 5:
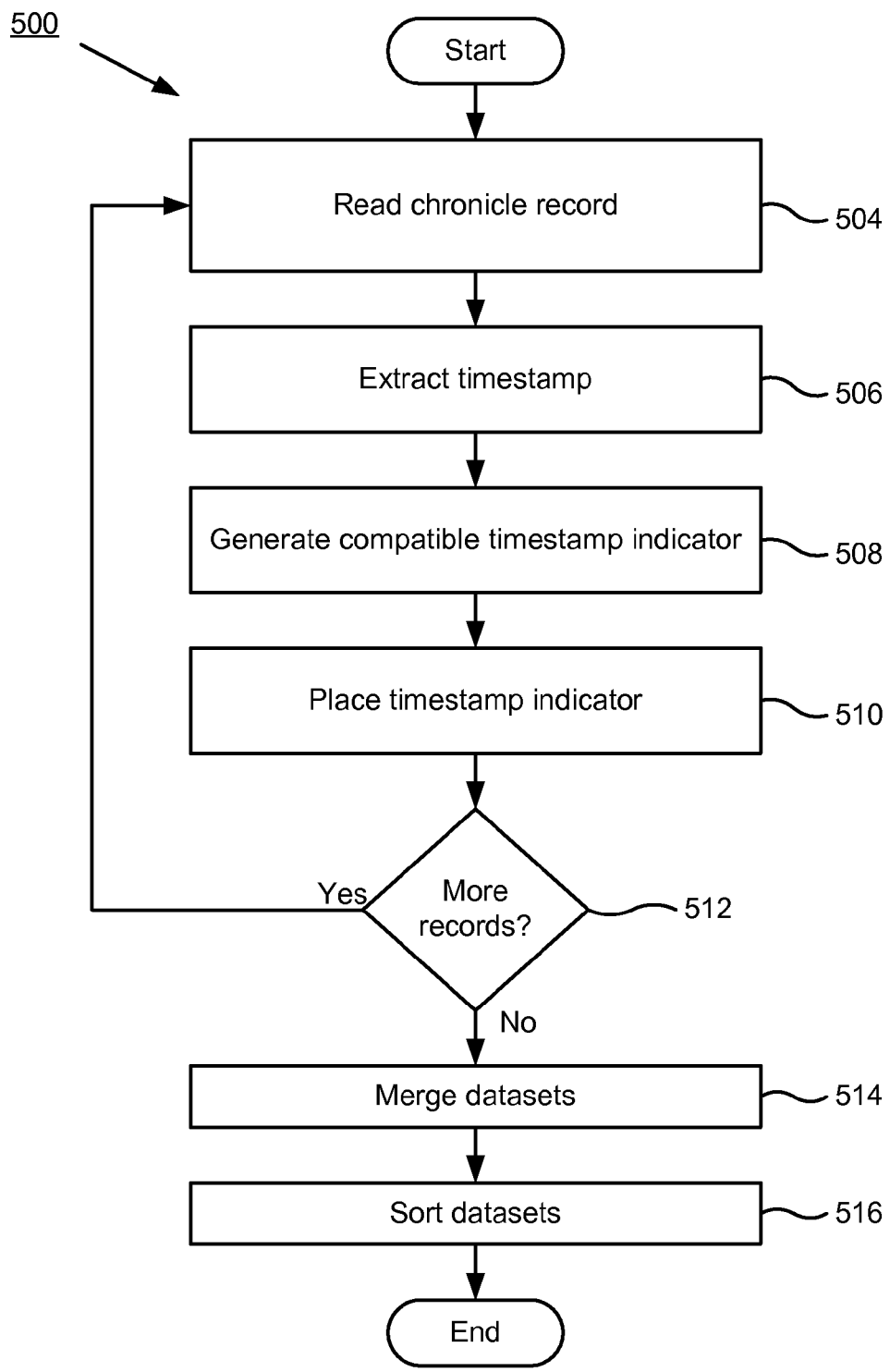
FIG. 5 is a schematic flow chart diagram illustrating one embodiment of a method for analyzing computer events in accordance with the present invention.

FIG. 5 illustrates one embodiment of a method 500 of the present invention. The method 500 comprises reading 504 a chronicle record 140 from a chronicle dataset 130, extracting 506 a timestamp from the chronicle record 140, generating 508 a timestamp compatible with a desired timestamp format, placing 510 the generated timestamp back into the chronicle record 140, repeating 512 the aforementioned steps for each chronicle record 140 in the chronicle dataset 130, merging 514 the modified chronicle dataset 130 with another chronicle dataset 130 having chronicle records 140 with the desired timestamp characteristics, and sorting 516 the merged dataset according to the timestamp field having the desired timestamp characteristics.

The method 500 may operate on two or more chronicle datasets 130. Generally, one of the chronicle datasets 130 has chronicle records 140 that have desired timestamp characteristics, and one of the chronicle datasets 130 has chronicle records 140 that have incompatible timestamp characteristics. When the method is completed, all the chronicle records 140 will have compatible timestamp characteristics.

In one embodiment, reading 504 of each chronicle record 140 reads each chronicle record 140 lacking the desired timestamp characteristics. The initialization parameters of the method may indicate which chronicle datasets 130 need to be read 504. In another embodiment, the process of reading 504 includes determining whether the read chronicle record 140 is compatible with the desired timestamp characteristics. In such an embodiment, no further processing is done on chronicle record 140 with compatible timestamp characteristics until the datasets are merged 514.

For each chronicle record 140 read, a timestamp is extracted 506 from the chronicle record 140. A chronicle timestamp indicator 438 is generated 508 based on the extracted timestamp. The chronicle timestamp indicator 438 may be built from a trace timestamp 452, or alternatively, the chronicle timestamp indicator 438 may be built from some other timestamp. In either case, the chronicle timestamp indicator 438 is compatible with the desired timestamp characteristics of for example a log time indicator 436.

The method 500 places 510 the generated timestamp indicator into the associated chronicle record 140. The placement may be a prepending, an appending, an insertion, or a modification of an appropriate location in the chronicle record 140.

The method 500 repeats 512 process steps 504, 506, 508, and 510 until all of the chronicle records 140 have been read. Once all of the records 140 have been read and updated, the chronicle datasets 130 are merged 514. Merging of the two datasets may comprise appending the records of one chronicle dataset 130 to the end of the other chronicle dataset 130 or alternatively, it may comprise creating a new output chronicle dataset 230.

The merged dataset 130 is sorted 516 according to the chronicle timestamp indicator 438 stored in each chronicle record 140. The final chronicle dataset 130 contains records 140 from the original chronicle datasets 130, sorted according to the creation time of each record 140.

In one embodiment, all of the chronicle records 140 stored in a chronicle dataset 130 are incompatible with the desired timestamp characteristics. In such a case, the method updates all the chronicle records 140 in a chronicle dataset 130. However, in another embodiment, a chronicle dataset 130 may contain a mixture of chronicle records 140, some with compatible timestamp characteristics, and others with incompatible timestamp characteristics. In this case, reading 504 each chronicle record 140 includes identifying those chronicle records 140 which need to be modified and those chronicle records 140 which do not need to be modified.

In one embodiment, generating 508 a compatible chronicle timestamp indicator 438 comprises reading a definition for a desired timestamp format and generating 508 a chronicle timestamp indicator 438 based on the definition read.

The method 500 may be performed by a service technician who initiates a software program which carries out the steps illustrated in FIG. 5. Such a software program could be stored on a signal bearing medium and would constitute an embodiment of the invention as well.

The present invention may be embodied in other specific forms without departing from its spirit or essential characteristics. The described embodiments are to be considered in al respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for analyzing computer events recorded in a plurality of datasets, each dataset comprising a plurality of records, the apparatus comprising:
    a computer-readable storage medium storing computer readable instructions;
    a computer executing the computer readable instructions, the computer readable instructions comprising:
        a read module accessing a chronicle dataset of chronicle records and a log dataset of log records, the chronicle dataset having an incompatible chronicle record comprising a timestamp having a format incompatible with the format of a log time indicator associated with each log record;
        an extraction module extracting the timestamp from the incompatible chronicle record;
        a generation module generating a chronicle time indicator based on the extracted timestamp, the chronicle time indicator having a format compatible with the format of the log time indicator;
        a placement module placing the chronicle time indicator into the associated incompatible chronicle record based on a position of the log time indicator within the log records;
        a merge module merging the incompatible chronicle record with the log records into a merged dataset such that the chronicle record and the log records are ordered based on times defined within the chronicle time indicator and the log time indicator of each log record; and
        a presentation module presenting the merged dataset of the chronicle record and the log records by way of a reporting tool displaying the merged records.

2. The apparatus of claim 1, the computer readable instructions further comprising an identification module identifying the incompatible chronicle record within the chronicle dataset.

3. The apparatus of claim 2 wherein the identification module references a chronicle timestamp definition and determines that the format of the timestamp in the incompatible chronicle record matches the chronicle timestamp definition.

4. The apparatus of claim 1 wherein the extraction module accesses a chronicle timestamp definition and decodes a timestamp in the incompatible chronicle record based on the chronicle timestamp definition.

5. The apparatus of claim 4 wherein the chronicle timestamp definition comprises one or more of a position of a timestamp in each chronicle record and a format of a timestamp in each chronicle record.

6. The apparatus of claim 4 wherein the chronicle timestamp definition comprises one or more of a timestamp length and a timestamp encoding, the timestamp encoding defining an encoding format selected from the group consisting of binary coded decimal, character encoding, and fixed binary.

7. The apparatus of claim 1 wherein the log time indicator comprises a sixteen byte trailing field at an end of each log record.

8. The apparatus of claim 7 wherein the trailing field comprises an eight byte time field followed by an eight byte sequence number.

9. The apparatus of claim 8 wherein the time field further comprises a sixty-four bit binary value representative of a duration of time since Jan. 1, 1900.

10. The apparatus of claim 9 wherein the sixty-four bit binary value is taken from a mainframe time of day clock.

11. A system for analyzing computer events recorded in a plurality of datasets, the system comprising:
    a computer-readable storage medium storing computer readable instructions;
    a computer executing the computer readable instructions, the computer readable instructions comprising:
    a read module accessing a set of chronicle records stored in a chronicle dataset, the chronicle dataset having an incompatible chronicle record comprising a header portion containing a timestamp having a format incompatible with the format of a log time indicator associated with a log record stored in a log dataset, wherein the first two bytes of the header portion contain a hexadecimal trace record type equal to 0x67FA and the timestamp comprises a twelve byte packed decimal value and wherein the last sixteen bytes of the log record contain an eight byte log time indicator followed by an eight byte sequence number, the log time indicator comprising an eight byte mainframe time of day clock value representative of a duration of time since Jan. 1, 1900;

an extraction module extracting the timestamp from the incompatible chronicle record;

a generation module generating a chronicle time indicator based on the extracted timestamp, the chronicle time indicator having a format compatible with the format of the log time indicator;

a placement module updating the incompatible chronicle record by placing the chronicle time indicator into the incompatible chronicle record in accordance with a position of the log time indicator within the log record; and a merge module merging the updated incompatible chronicle record with the log record such that the chronicle record and the log record are ordered based on times defined within the chronicle time indicator and the log time indicator.

12. The system of claim 11 further comprising an identification module identifying the at least one incompatible chronicle record within the chronicle dataset by locating a record containing the hexadecimal value 0x67FA in the first two bytes of the incompatible chronicle record.

13. The system of claim 12 wherein extracting the timestamp from the incompatible chronicle record comprises accessing a chronicle timestamp definition and decoding the timestamp in the header portion according to the chronicle timestamp definition.

* * * * *